(12) United States Patent
Turek et al.

(10) Patent No.: US 12,460,730 B2
(45) Date of Patent: Nov. 4, 2025

(54) COMPLIANT JOINT DRIVE ASSEMBLY

(71) Applicant: Goodrich Corporation, Charlotte, NC (US)

(72) Inventors: Łukasz Turek, Wrocław (PL); Łukasz Sędlak, Miłochowice (PL); Piotr Ząc, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 546 days.

(21) Appl. No.: 17/943,555

(22) Filed: Sep. 13, 2022

(65) Prior Publication Data

US 2023/0079424 A1    Mar. 16, 2023

(30) Foreign Application Priority Data

Sep. 13, 2021  (EP) .................................... 21461592

(51) Int. Cl.
  *F16K 5/06*   (2006.01)
  *F16K 31/04*  (2006.01)

(52) U.S. Cl.
  CPC .......... *F16K 5/0647* (2013.01); *F16K 31/047* (2013.01)

(58) Field of Classification Search
  CPC .... F16K 5/0647; F16K 31/041; F16K 31/047; F16D 3/74
  See application file for complete search history.

(56) References Cited

U.S. PATENT DOCUMENTS

| | | | |
|---|---|---|---|
| 3,687,415 A * | 8/1972 | Turkot | F16K 31/055 251/89 |
| 6,155,875 A | 12/2000 | Ineson | |
| 7,303,481 B2 * | 12/2007 | Campany | F16K 31/045 464/89 |
| 8,172,198 B2 | 5/2012 | Dorsey et al. | |
| 9,939,458 B2 | 4/2018 | Castillo et al. | |
| 2005/0008504 A1 | 1/2005 | Reese | |
| 2008/0041476 A1 | 2/2008 | Campany et al. | |
| 2013/0341069 A1 | 12/2013 | Demaretz | |
| 2017/0130684 A1 | 5/2017 | Baskin | |
| 2019/0232470 A1 | 8/2019 | Xu | |
| 2020/0376635 A1 | 12/2020 | Raskin et al. | |
| 2021/0171765 A1 | 6/2021 | Wandner | |

OTHER PUBLICATIONS

European Search Report for Application No. 21461592.4, mailed Mar. 7, 2022, 8 pages.

* cited by examiner

*Primary Examiner* — Eric Keasel

(74) *Attorney, Agent, or Firm* — CANTOR COLBURN LLP

(57) ABSTRACT

A torque transfer assembly includes a drive shaft and a driven shaft and a dielectric connector positioned between. The connector connects the drive shaft and the driven shaft and includes a body of dielectric material defining an insulating barrier between the drive and the driven shaft. The connector includes a dielectric barrier body having a first side from which a protrusion extends, the protrusion configured to engage in a correspondingly shaped recess formed in one of the drive shaft or the driven shaft, and a second side, opposite the first side, in which is formed a recess shaped to receive a correspondingly shaped protrusion extending from the other of the drive shaft or the driven shaft, the connector providing a dielectric barrier between the drive shaft and the driven shaft.

9 Claims, 7 Drawing Sheets

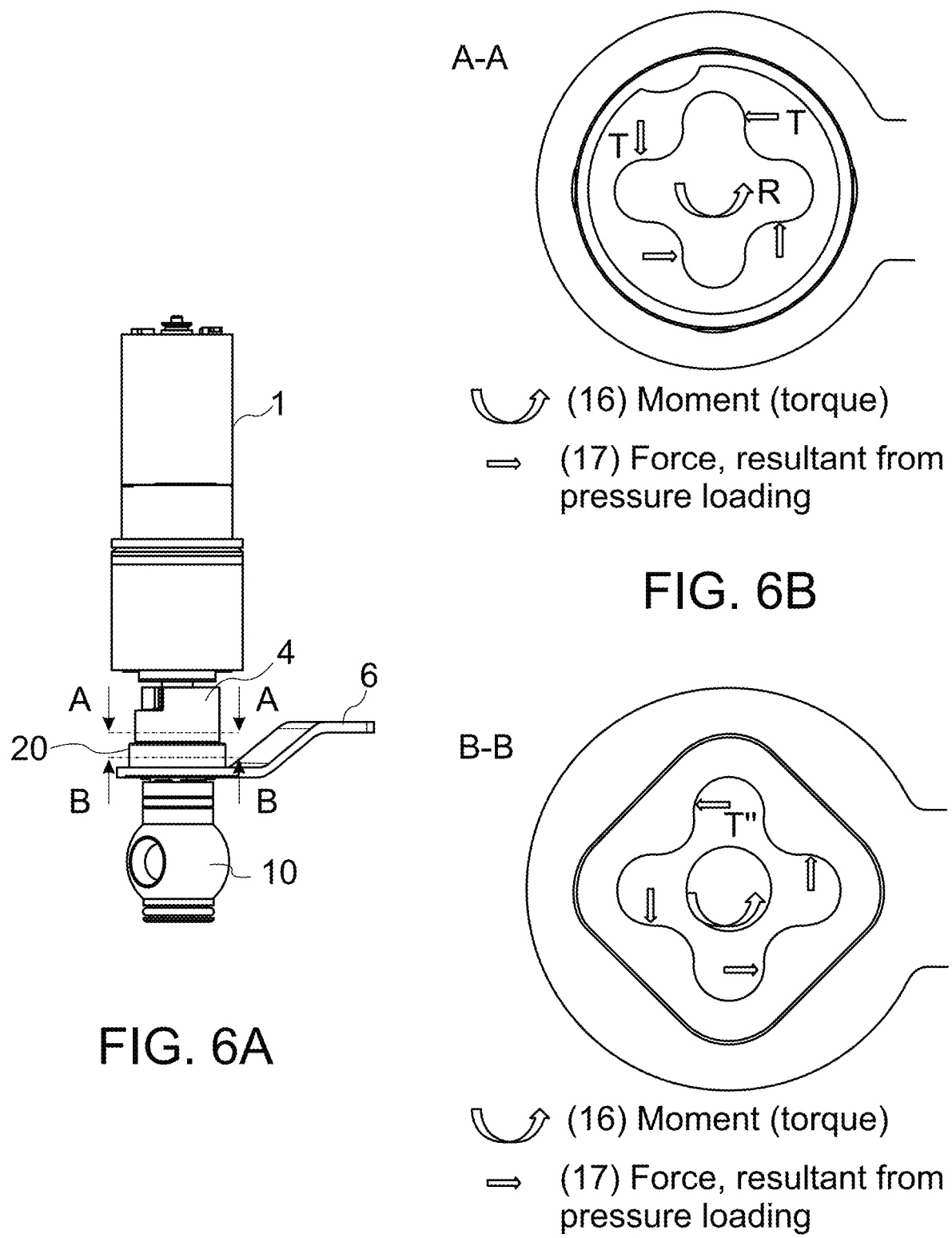

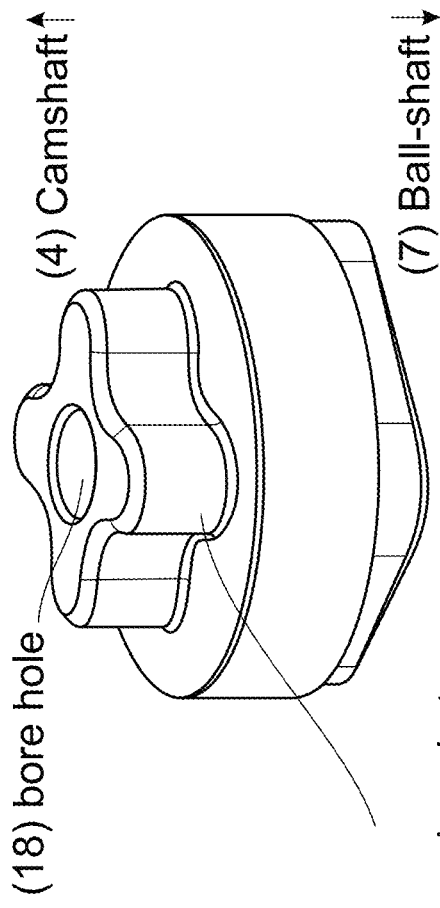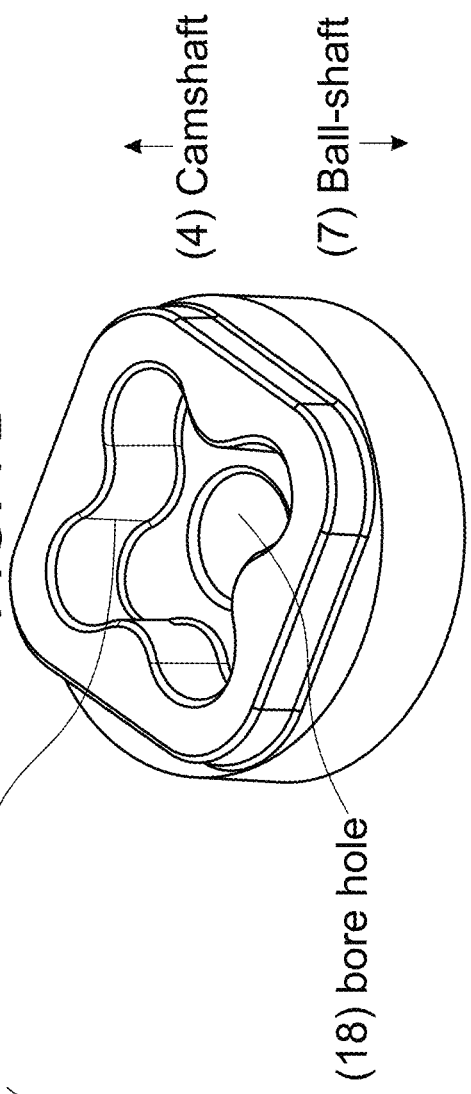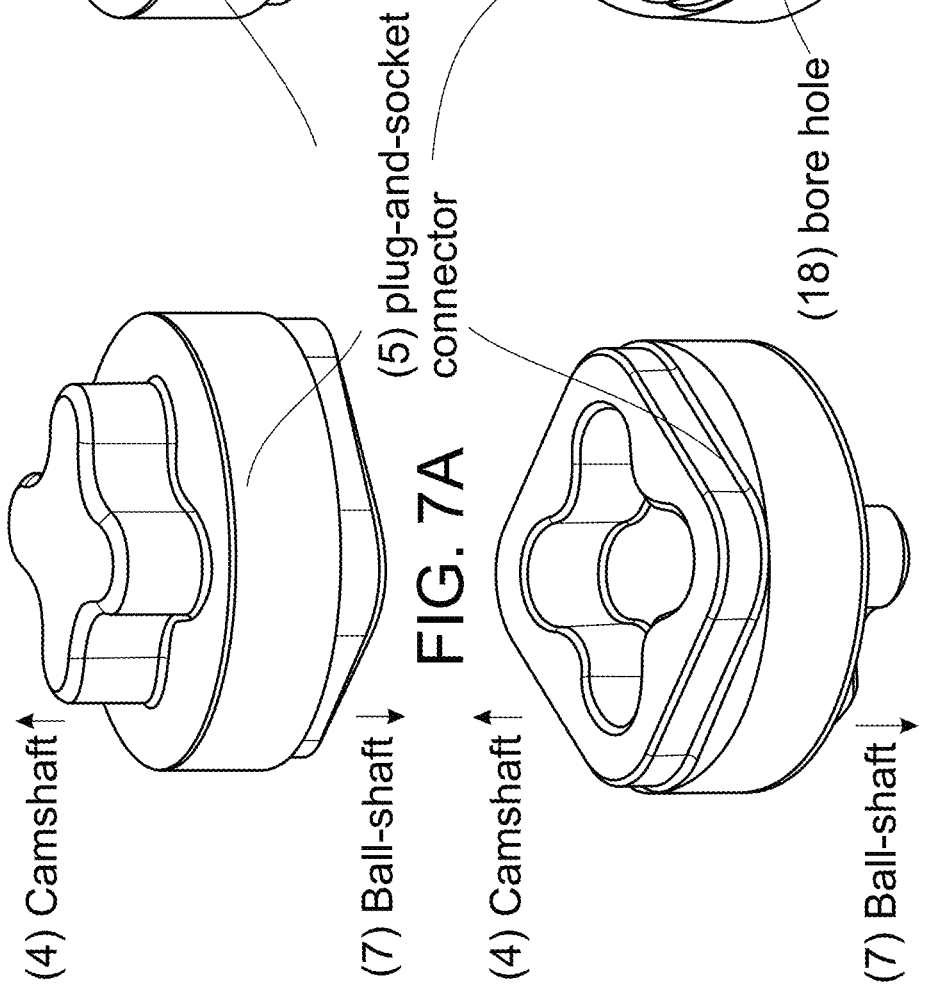

COMPLIANT JOINT DRIVE ASSEMBLY

CROSS-REFERENCE TO RELATED APPLICATIONS

This application claims priority to European Patent Application No. 21461592.4 filed Sep. 13, 2021, the entire contents of which is incorporated herein by reference.

TECHNICAL FIELD

The present disclosure relates to a compliant joint drive assembly whereby torque is transmitted from one end of the assembly to the other, the two ends joined by a compliant joint. An example of such an assembly is a ball valve assembly and, in particular, an assembly for a motorised ball valve.

BACKGROUND

Drive assemblies are used in many applications where a driving force is provided by an actuator such as a manual lever or a motor and the torque from the actuator is transmitted to a movable part along a drive line. For example, a valve may include a valve closure that is rotated by an actuator, either manually by means of a lever or handle or by means of a motor. The drive force from the motor is transmitted to the valve closure along a shaft arrangement, the shaft configured to transfer torque from the actuator to the valve closure. Particularly where the actuator is an electric motor, there is often a need to provide dielectric separation between the electrics and the moveable part especially if the movable part is in e.g. a wet environment, to avoid damage to the 'dry' motor end. On the other hand, it is necessary to maintain torque transmission along the entire drive line.

Ball valves are valves for controlling flow of a fluid e.g. water. The valve includes a ball shaft having a hole therethrough. The ball shaft is rotatable relative to the fluid flow channel such that when the hole is aligned with the channel, the valve allows fluid flow. To stop flow, the ball shaft is rotated so that the hole is not aligned with the flow. Ball valves can be operated manually e.g. by means of a handle for rotating the ball. Actuated ball valves are operated by a motor, which moves the ball shaft between the open and closed positions. Ball valves find use in e.g. sanitation or water systems. One application of a valve moved by an electric motor is in an aircraft water supply system. Aircraft commonly have a water supply system for providing potable water to various outlets e.g. to sinks or wash basins, coffee machines, toilets, etc. One or more valve assemblies is provided in the system for the various outlets and at least some of these are driven by an electric motor so that they can be operated remotely or automatically. Such a system is described e.g. in U.S. Pat. No. 8,172,198. The use of actuated ball valves is, however, not limited to aircraft water systems and there are many other fields of application for such systems.

Actuated ball valves comprise the motor and drive part, also known as the 'dry' part, and the ball shaft part, which comes into contact with the water, also known as the 'wet' part. Seals need to be provided between the wet part and the dry part to avoid damage to the assembly by water getting to the electric motor.

In aircraft systems and in other water systems, the valve ball shaft often has to be made of metal to satisfy durability and safety standards. Problems may occur with the valve if a fault in the electric motor transmits to the ball shaft due to the conductive path between the various metal parts.

The inventors have identified a need for a dielectric barrier to be provided between the two ends of a drive train e.g. between the ball shaft and the electric drive part of a ball valve assembly. The design should be capable of transmitting torque from the actuator end of the drive to the moveable part even in the event that the moveable part experiences some resistance e.g. becomes jammed or frozen such that a short torque peak is experienced.

SUMMARY

According to the disclosure, there is provided a torque transfer assembly comprising a drive shaft and a driven shaft and a dielectric connector positioned between, and connecting the drive shaft and the driven shaft, the connector comprising a body of dielectric material defining an insulating barrier between the drive and the driven shaft, the connector comprising a dielectric barrier body having a first side from which a protrusion extends, the protrusion configured to engage in a correspondingly shaped recess formed in one of the drive shaft or the driven shaft, and a second side, opposite the first side, in which is formed a recess shaped to receive a correspondingly shaped protrusion extending from the other of the drive shaft or the driven shaft, the connector providing a dielectric barrier between the drive shaft and the driven shaft.

The connector protrusion preferably has anon-circular cross-section and may be formed as lobes or ribs. The connector recess is preferably also non-circular, and may also define lobes, ribs or the like. The shape of the connector protrusion and the connector recess can be the same or different.

The assembly may be a ball shaft assembly comprising a ball shaft as the driven shaft. A motor may be arranged to drive the ball shaft via a cam shaft, as the drive shaft, the connector being located between and in torque transfer engagement with the ball shaft and the cam shaft.

The ball shaft may be part of a water supply system e.g. an aircraft water supply system.

BRIEF DESCRIPTION OF THE DRAWINGS

Preferred embodiments will now be described by way of example only, with reference to the drawings in which:

FIGS. 6A, 6B and 6C show the moment acting on the torque transfer components of an assembly according to the disclosure; and FIGS. 7A to 7D show some possible alternative designs for the assembly according to the disclosure.

DETAILED DESCRIPTION

Figure 1:
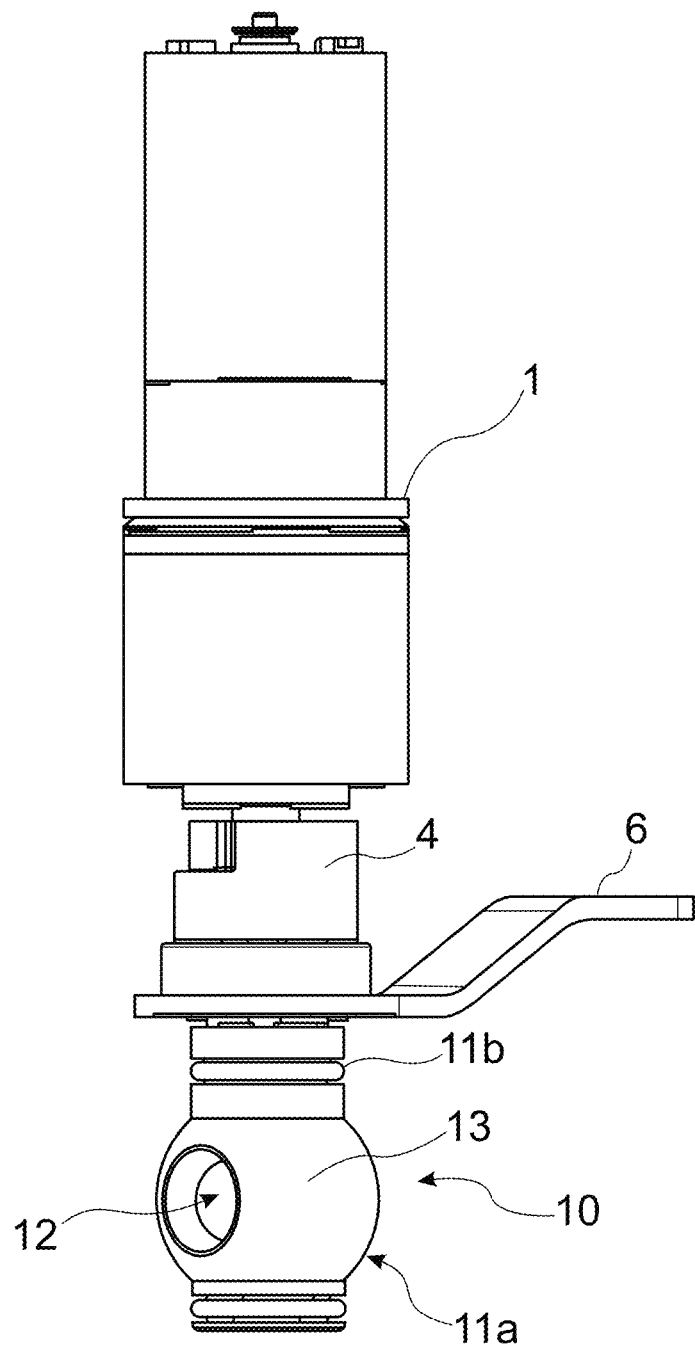
FIG. 1 is a perspective view of a motor driven ball valve assembly that can comprise a connector according to this disclosure.

FIG. 1 is a perspective view of a motorised ball valve assembly including a dielectric insulation component according to the present disclosure.

The operational part of the valve comprises a ball shaft 10 having a head part 11*a* defining a hole 12 therethrough defining a flow passage, and a shaft part 11*b* extending from the head for engagement with a drive part of the assembly. In use, the valve is arranged in a water or fluid pipe system such that in a first rotational position of the ball shaft 10, the hole is aligned with a fluid pipe to form a flow passage from the pipe and through the hole 12. To switch off the flow, the ball shaft is rotated e.g. by one quarter turn, so that the hole is no longer aligned with the pipe and, instead, flow from the pipe is blocked by the body 13 of the ball shaft. Valves with several positions and several input/output ports are known.

Figure 2:
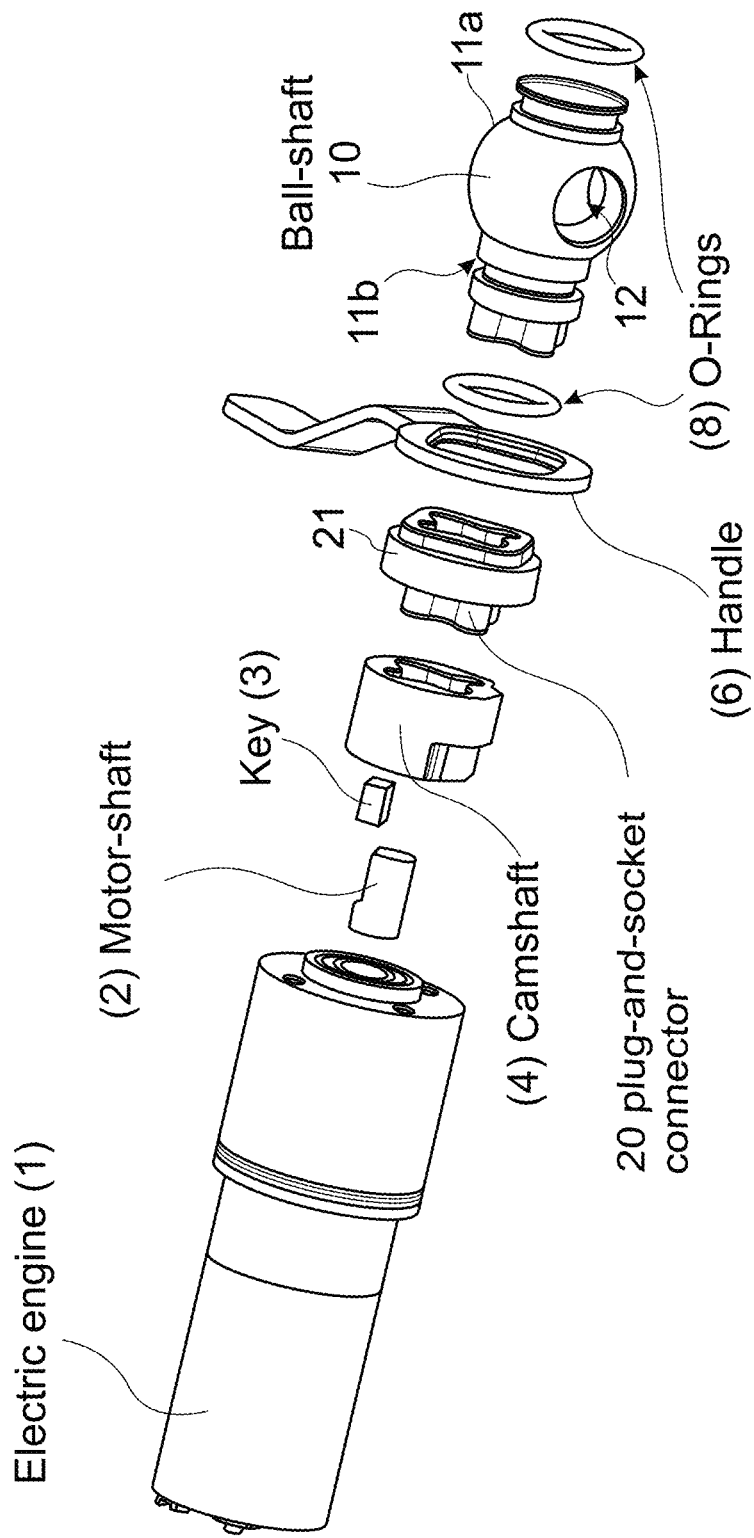
FIG. 2 is an exploded view of the assembly of FIG. 1 according to one example.
Figure 3A:
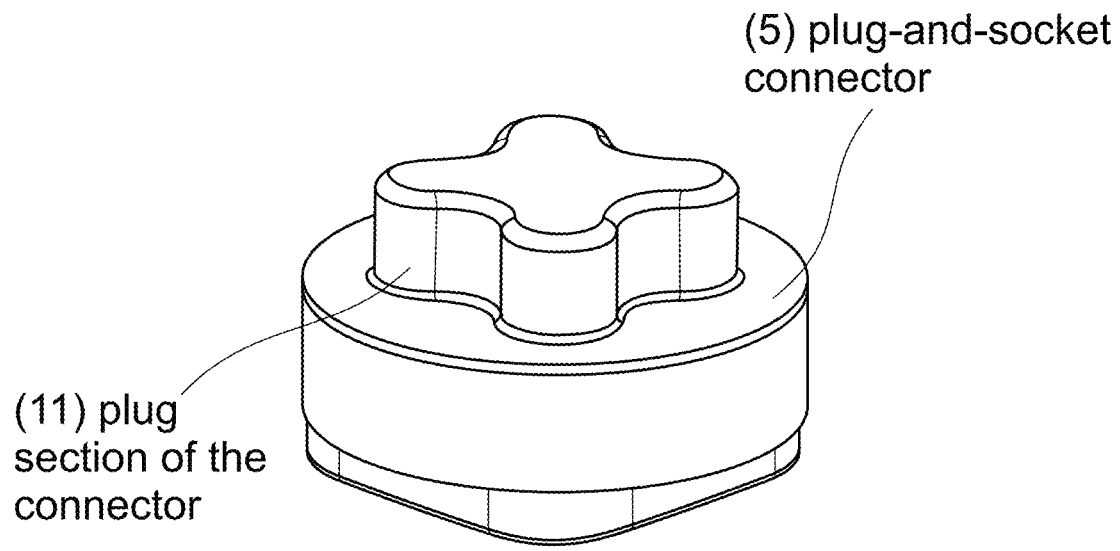
FIG. 3A shows a perspective view of a connector for use in the assembly of the disclosure.
Figure 3B:
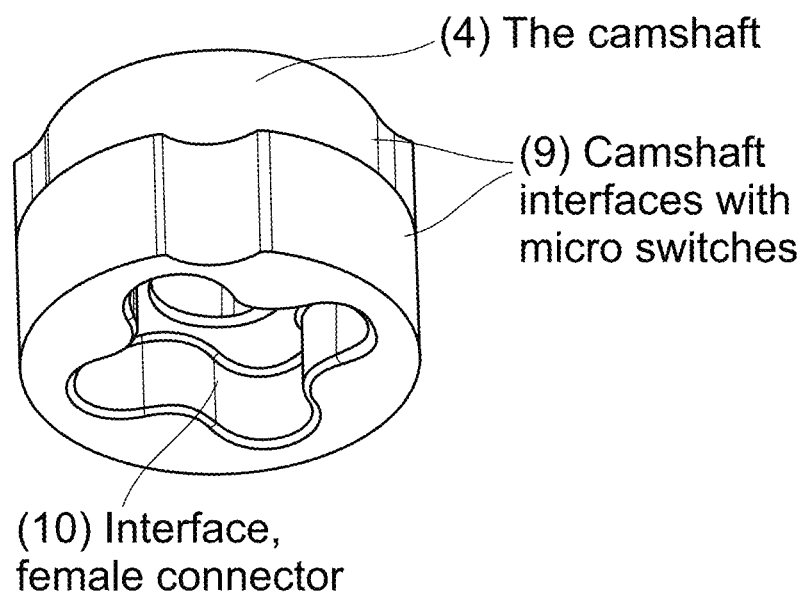
FIG. 3B shows the connector of FIG. 3A as attached to a cam shaft in one example of an assembly of the disclosure.
Figure 4A:
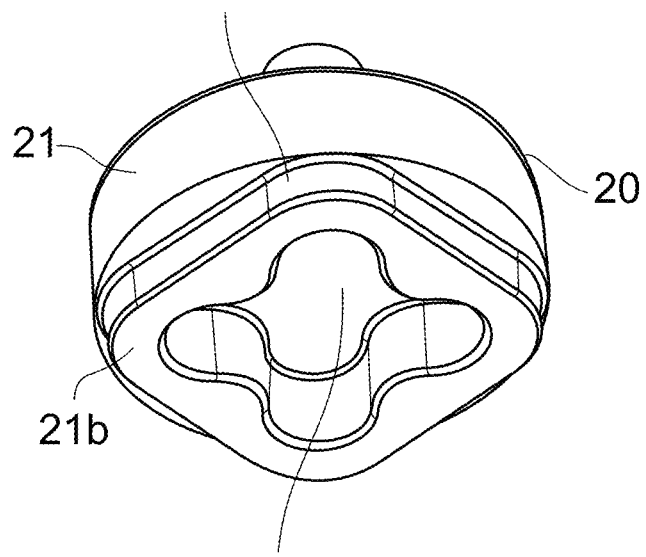
FIG. 4A shows an alternative perspective view of a connector for use in the assembly of the disclosure.
Figure 4B:
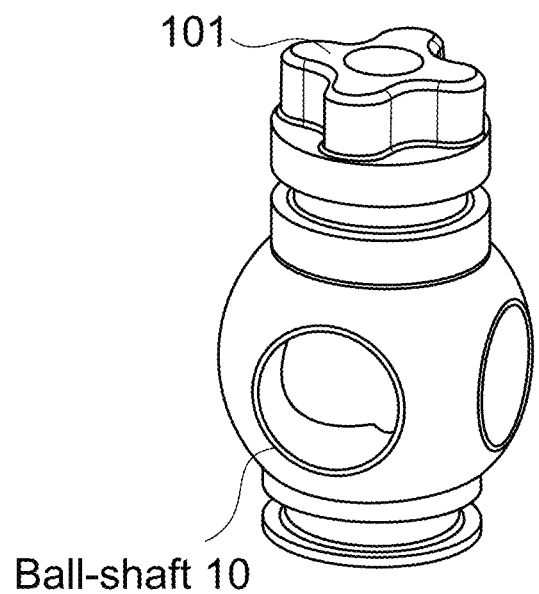
FIG. 4B shows the connector of FIG. 4A as attached to a ball shaft in one example of an assembly of the disclosure.
Figure 4C:
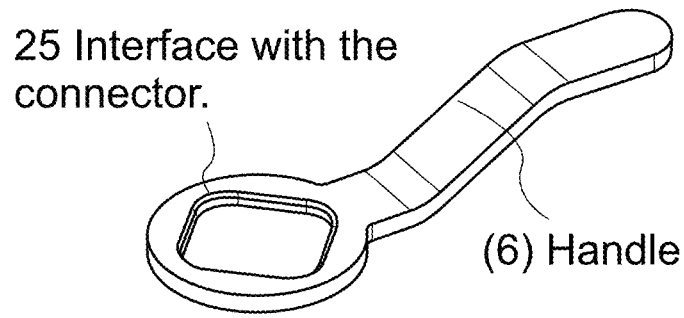
FIG. 4C shows a handle that can be attached to the connector.

In a motorised ball valve, the ball shaft is rotated by means of an electric motor 1. The electric motor 1 drives a cam shaft 4 which engages with the ball shaft 10. In the example shown (see FIG. 2) the cam shaft 4 is provided with a key feature 3 that engages with a D-shaft 2—i.e. a D-shaped shaft component extending from the motor. Rotation of the motor 1 causes rotation of the D-shaft 2 which, in turn, rotates the cam shaft 4 which rotates the ball shaft 10. Seals e.g. O-rings 8 are provided around the ball shaft 10 to prevent water passing into the electric part of the assembly. The cam shaft may be provided with a profile 9 to interface with indicators such as microswitches (not shown), or other forms of sensors or indicators, to provide an indication of the angular position of the shaft. These components are standard for a motorised ball valve such as described in U.S. Pat. No. 8,172,198.

In the event that the motor fails, there is not only the risk of an electrical fault being transmitted to the wet end of the assembly, but there is also the problem that a motor failure will mean that the ball shaft cannot be rotated. In the event of failure of the motor, it may be necessary to change the position of the ball shaft to switch flow on or off. To address this, a manual handle 6 may be provided t so that manual operation of the handle can rotate the ball shaft 10. The handle can be fitted to the assembly such that there is a form fitting or frictional engagement between them. Alternatively, a fixing element e.g. a locking pin (not shown) may be provided to secure the handle to the assembly.

As mentioned above, to provide the required strength and to satisfy other standards such as safety, durability and hygiene standards, the various shafts and the key feature will often be made of metal e.g. steel. If there is a problem with the electrics at the motor end of the assembly, these would be transmitted directly to the ball shaft and can cause problems such as electric shocks or arcing. To avoid this problem, the assembly of the present disclosure includes a dielectric insulator connector 20 to be fitted between the ball shaft 10 (or, more generally, driven end) and the electric motor 1 (or, more generally, drive end).

The dielectric insulation connector is structured to have dielectric properties and is shaped to provide torque transmission from the electric motor 1 to the ball shaft 10. The shape of the connector should be such as to be able to withstand a short torque peak if the ball shaft end is fixed or blocked. To achieve the torque transfer property, the connector is shaped to define lobes or ribs, or is otherwise non-circular, to engage with corresponding engagement features provided at the ball shaft and the cam shaft as described further below. The important thing is that the connector has a shape that can engage with the shafts between which it is located in a manner that torque applied to one of the shafts is transferred to the other shaft via the connector.

The connector according to the disclosure may have different forms, as will be described further below, but it is a discrete component made from a body of dielectric material and has a shape arranged to mate with a corresponding shape on the cam shaft and/or the ball shaft or a bushing provided on the ball shaft 10. The mating structure should be such that any misalignment can be accommodated. The connector is a simple, re-usable component easily manufactured from a readily available starting material which can be appropriately shaped and then easily assembled and secured between the cam shaft (or, more generally drive end) and the ball shaft (or, more generally, driven end) to ensure reliable torque transfer between the ends. In an example, particularly for use in wet or harsh environments, all of the components required for torque transfer are made of steel, particularly stainless steel expect for the dielectric connector 20 which functions as a dielectric barrier between the steel parts.

Whilst the connector may have different shapes, as described below, ideally, to ensure reliable torque transmission, the shape should be such as to define multiple points of engagement, as such a structure has been found to transfer the required torque optimally. The camshaft pushes the connector, and the connector pushes the ball shaft. Multiple forces act on distances to the centre of moment. In all examples, the connector and the mating parts of the drive end and the driven end should form a tight fit to reduce the effects of backlash and to ensure coaxiality. The connector can be e.g. machined to shape from tubing or can be moulded to shape.

As shown in FIGS. 3 to 7 the connector 20 is formed as a plug-and-socket component of dielectric material that is arranged to be fitted between the cam shaft 4 and the ball shaft 10 to form a dielectric barrier. The connector comprises a body 21 having, in the examples, an essentially circular cross-section such that the periphery of the body 21 essentially aligns axially with the outer shape of the cam shaft and the ball shaft such that, when assembled, the cam shaft, the connector and the shaft part of the ball shaft define an essentially cylindrical assembly (see e.g. FIG. 5). The body 21 can be of a different diameter to that of the cam and/or ball shaft. The connector further includes a protrusion 22 extending from one side 21*a* of the body and a recess or socket 23 formed in the other side 21*b* of the body 21. The protrusion 22 is shaped to be received in a correspondingly shaped recess or socket formed in one of the cam shaft or the ball shaft. The recess or socket 23 of the connector is shaped to receive a correspondingly shaped protrusion on the other of the cam shaft and the ball shaft.

In the example shown in FIGS. 1, 3A and 3B and 4A and 4B, the connector has a protrusion 22 on one side of the body 21 and the drive shaft (here, the cam shaft 4) is formed with a matching recess or socket 41 to receive the connector protrusion. On the opposite side of the connector body 21, a recess 23 is formed to define a socket, and a matching protrusion 101 is formed on the shaft 11*b* of the ball shaft 10 to fit into the connector socket 23 on assembly. In other examples (e.g. as described with reference to FIGS. 7C and 7D, the connector protrusion may be on the side that connects to the ball shaft, in which case, the ball shaft is formed with a corresponding recess, whereas the cam shaft side of the connector has a socket and the cam shaft has a protrusion to be received in the connector socket.

To ensure effective torque transfer, the sockets and protrusions should have non-circular cross-sections. One design that the inventors have found to be advantageous in this respect is a shape forming multiple lobes 22a separated by valleys 22b. The examples show four lobes 22a, but advantages can be obtained with two or more lobes. Other shapes are also possible. A non-circular shape avoids slip between the components on rotation even in the event that there is some resistance to rotation at one of the parts of the assembly.

The provision of a connector 20 in the length of the assembly between the drive and the driven shafts also provides the opportunity to fit a manual handle 6 to the connector 20 rather than to one of the drive or driven shafts. As mentioned above, the drive and driven shafts are usually made of metal and are therefore conductive. There is, therefore, a risk of an electric shock being passed to a user touching the handle 6 if it is mounted, as is typical, to the shafts. With the connector 20 of this disclosure, the handle can be fitted to the connector body. In one example, the connector body is formed with a shaped interface 24 with which a handle interface 25 can engage (see FIGS. 1, 4A and 4C). Again the interfaces 24 and 25 should have a matching and non-circular shape for torque transfer between the handle and the connector (and thus the ball shaft connected in torque transfer engagement with the connector).

Figure 5:
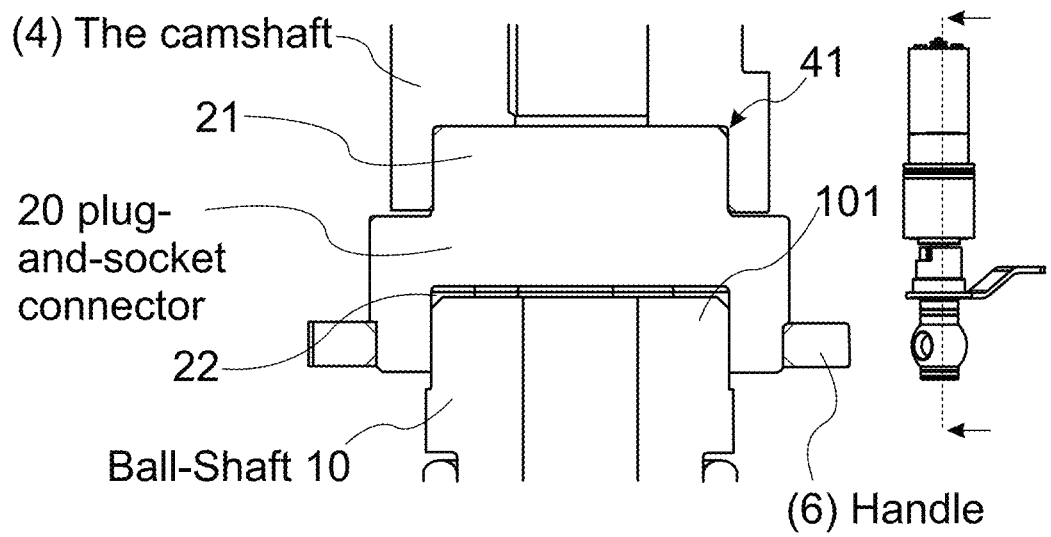
FIG. 5 is a cross-section through an assembly such as shown in FIG. 1 showing the connector assembled between a ball shaft and a cam shaft.

When the connector is assembled between the cam shaft and the ball shaft, as best seen in FIG. 5, the connector 20 forms a dielectric barrier between the two shafts as the metal shafts are nowhere in direct electrically conductive contact with each other. Furthermore, the tight-fitting, shaped engagement between the connector and the shafts ensures torque transfer through the assembly.

With reference to FIGS. 6A to 6C, the torque loading between the component parts of the assembly can be seen. FIG. 6A shows by arrow R the torsional moment (torque) and the direction and arrows T represent multiple pairs of forces resulting from pressure loading between the cam shaft and the connector when the assembly is rotated in the direction of arrow R. FIG. 6C shows, by arrows T', the resultant forces between the connector and the ball shaft.

As mentioned above, many shapes and configurations are possible within the scope of this disclosure. FIGS. 7A and 7B show examples in which the connector protrusion fits into a socket on the cam shaft and a protrusion on the ball shaft fits into a socket on the connector. FIGS. 7C and 7D show examples in which the connector protrusion fits into a socket on the ball shaft and a protrusion on the cam shaft fits into a socket on the connector. In the examples of FIGS. 7B and 7D, a bore hole 18 is formed through the protrusion to make the connector more lightweight.

Various dielectric materials can be used for the connector and can be selected depending on the required properties for the application e.g. dielectric properties, robustness, lightweight, cost, workability, corrosion resistance, thermal properties, long life. Some examples include PEEK, carbon composite materials such as G10/FR4 or G11/FR5, Plasma electrolytic oxidation (PEO)-aluminium, ceramics etc. Zirconia, yttrium oxide (Y2O3), rubber, etc. Ideally, the material selected should have superior strength in terms of compression rather than in the tension or shear directions, as the torque is transferred in the compression direction as shown in FIGS. 6B and 6C. Plastic and rubber materials allow the sleeve to buffer vibration or shocks sent by the motor through the system.

The connector can be quickly and easily fitted and does not require precise alignment, since it will naturally slot into the right position even if initially located slightly out of alignment. It is therefore impossible to assemble the connector incorrectly. The tight fitting between the parts reduces the effect of any backlash and ensures reliable torque transfer. The shape is also such that coaxiality between the parts is ensured.

The dielectric barrier and compliant joint drive have been described above in the context of a ball shaft valve assembly. This is only an example of where the dielectric barrier can provide advantages and can find application. The dielectric barrier assembly of this disclosure can, however, find application in other assemblies where torque is transmitted between a drive end and a driven end.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A torque transfer assembly comprising:
   a drive shaft;
   a driven ball shaft; and
   a dielectric connector positioned between, and connecting the drive shaft and the driven ball shaft, the connector comprising:
      a body of dielectric material defining a dielectric insulating barrier between the drive and the driven ball shaft, the body;
      having a first side from which a protrusion extends, the protrusion configured to engage in a correspondingly shaped recess formed in one of the drive shaft or the driven ball shaft, and a second side, opposite the first side, in which is formed a recess shaped to receive a correspondingly shaped protrusion extending from the other of the drive shaft or the driven ball shaft; and
   a handle to manually rotate the ball shaft, the handle being received in a groove included in the dielectric connector.

2. The assembly of claim 1, wherein the protrusion has a non-circular cross-section.

3. The assembly of claim 1, wherein the recess has a non-circular cross section.

4. The assembly of claim 1, wherein the protrusion is shaped as a plurality of lobes.

5. The assembly of claim 1, wherein the recess defines a plurality of lobe-shaped recesses.

6. The assembly of claim 1, wherein the drive shaft is cam shaft and further comprising a motor arranged to drive the ball shaft via the cam shaft.

7. The assembly of claim 6, wherein the motor is an electric motor.

8. A water supply system including the assembly of claim 1.

9. The water supply system of claim 8, being an aircraft water supply system.

* * * * *